(12) United States Patent
Tyagi et al.

(10) Patent No.: US 8,947,505 B2
(45) Date of Patent: Feb. 3, 2015

(54) METHOD AND APPARATUS FOR GENERATING TEXTURE IN A THREE-DIMENSIONAL SCENE

(75) Inventors: Ambrish Tyagi, Palo Alto, CA (US); John Drinkard, Foster City, CA (US)

(73) Assignee: Omron Scientific Technologies, Inc., Fremont, CA (US)

(*) Notice: Subject to any disclaimer, the term of this patent is extended or adjusted under 35 U.S.C. 154(b) by 846 days.

(21) Appl. No.: 13/075,214

(22) Filed: Mar. 30, 2011

(65) Prior Publication Data

US 2011/0242283 A1 Oct. 6, 2011

Related U.S. Application Data

(60) Provisional application No. 61/319,395, filed on Mar. 31, 2010.

(51) Int. Cl.
*H04N 13/02* (2006.01)
*G01B 11/25* (2006.01)
*G06T 7/00* (2006.01)
*G06T 15/00* (2011.01)

(52) U.S. Cl.
CPC .......... *G01B 11/2545* (2013.01); *G06T 7/0057* (2013.01); *G06T 7/0075* (2013.01); *G06T 2207/10012* (2013.01); *G06T 2207/10152* (2013.01)
USPC .............................................. 348/46; 345/419

(58) Field of Classification Search
CPC ................... G06T 7/0057; G06T 2207/10152;
G06T 19/20; G06T 7/0059; G06T 5/007;
G06T 2207/10012; G03B 17/18; G03B 17/24;
H04N 19/00769; H04N 5/2354
See application file for complete search history.

(56) References Cited

U.S. PATENT DOCUMENTS

| | | | | |
|---|---|---|---|---|
| 5,872,867 | A * | 2/1999 | Bergen | 382/254 |
| 6,281,904 | B1 * | 8/2001 | Reinhardt et al. | 345/582 |
| 2004/0119833 | A1 | 6/2004 | Duncan et al. | |
| 2006/0221072 | A1 | 10/2006 | Se et al. | |
| 2006/0268153 | A1 | 11/2006 | Rice et al. | |
| 2007/0171220 | A1 | 7/2007 | Kriveshko | |
| 2007/0263903 | A1 * | 11/2007 | St. Hilaire et al. | 382/106 |
| 2010/0091301 | A1 | 4/2010 | Masuda | |

* cited by examiner

*Primary Examiner* — Behrooz Senfi
*Assistant Examiner* — Mohammed Jebari
(74) *Attorney, Agent, or Firm* — Murphy Bilak & Homiller, PLLC

(57) ABSTRACT

In one aspect of the teachings herein, a 3D imaging apparatus uses a "texture tool" or facilitates the use of such a tool by an operator, to add artificial texture to a scene being imaged, for 3D imaging of surfaces or background regions in the scene that otherwise lack sufficient texture for determining sufficiently dense 3D range data. In at least one embodiment, the 3D imaging apparatus provides for iterative or interactive imaging, such as by dynamically indicating that one or more regions of the scene require artificial texturing via the texture tool for accurate 3D imaging, and then indicating whether or not the addition of artificial texture cured the texture deficiency and/or whether any other regions within the image require additional texture.

17 Claims, 7 Drawing Sheets

METHOD AND APPARATUS FOR GENERATING TEXTURE IN A THREE-DIMENSIONAL SCENE

RELATED APPLICATIONS

This application claims priority from the U.S. provisional patent application filed on 31 Mar. 2010 and identified by Application No. 61/319,395.

FIELD OF THE INVENTION

The present invention generally relates to machine vision and three-dimensional imaging, and particularly relates to generating texture in three-dimensional scenes.

BACKGROUND

In general, multi-view reconstruction techniques first establish a correspondence between the two dimensional (2D) images of a scene as viewed by respective multiple sensors. For example, two cameras may be arranged to have overlapping fields-of-view, so that they image the same area with known angular and translational offsets. Three dimensional (3D) scene reconstruction involves triangulating the correspondences between the 2D images, given the geometric relationship between different views.

The task of establishing correspondence across multiple views relies on the extraction of robust image features in each related 2D view. Typically, such features are characterized by local variations in image contrast. These local contrast variations are commonly referred to as "texture." In a general case, the viewed scene may contain regions corresponding to surfaces that lack sufficient texture for successful correspondence, thus making it difficult or impossible to obtain a complete 3D reconstruction of the scene. Such regions may be referred to as being "textureless." Some common examples are flat, uniformly painted and illuminated walls, floors, or tables.

The risk of not being able to obtain image correspondence due to insufficient texture is often mitigated using at least one of two methods. A first method modifies the surfaces at issue, such as through painting or by affixing textured markers. Another approach involves the projection of structured light into the area during imaging, to "add" texture to otherwise textureless regions.

Applications in which it is necessary to have a fully textured view at all times primarily benefit from the above mitigations. However, for large monitoring areas, such mitigations are often expensive and inconvenient. Imagine, for example, a sensing apparatus that is intended to monitor a given area defined by boundaries that are configured during system setup. Such boundaries may correspond to physical surfaces, or they may represent virtual surfaces defined by 3D volumes. A machine vision system based on the use of stereoscopic cameras provides a good working example of such a system.

An apparatus based on stereo vision includes some type of stereo vision sensor or range data analyzer that analyzes clusters of 3D points in the monitored volume, using criteria necessary to establish the presence and position of objects bigger than the minimum detectable size. The position of an object is compared against the configured boundary, which defines the monitored volume, and a decision is made as to whether or not an intrusion has occurred.

One approach for boundary configuration relies on a user manually entering the boundary coordinates. For example, an authorized user has access to a PC-based configuration tool that provides an interface to the apparatus, for manually configuring the monitoring boundaries according to defined coordinates. This approach requires the user to calculate or know boundaries before system setup, and may not be convenient.

Another way to configure boundaries is to let the apparatus measure them. This approach is commonly called a "learning" mode, wherein the apparatus automatically learns the positions of physical surfaces already present in the viewed area. Boundaries are automatically configured to be positioned along the learned physical surfaces, separated by a specified tolerance/standoff. The user may then accept or modify the configured learned boundaries, as required for the application. However, to the extent that some portion of the boundaries to be learned automatically is textureless, the apparatus will miss such portions or will not range such portions with sufficient accuracy. The user may manually enter coordinates for the problem boundary portions, but doing so imposes an inconvenience on the user and interferes with fully automatic acquisition of boundary information.

Moreover, during setup of such an apparatus, care must be taken such that the configured boundaries (defining the monitored volume) are consistent with the projective nature of the sensor's field of view (e.g., within the field of view of a stereoscopic vision camera included within the apparatus). In other words, each part of the configured boundary must be viewable—without being shadowed—anywhere in the sensor field of view. Further, once boundaries are configured the user usually must check their validity. The check may be done by moving special textured test pieces or test panels across each boundary. Such an approach is time consuming and inconvenient, and therefore prone to error. Additionally, in some safety applications, it may be necessary to guarantee the presence of a physical background within a maximum distance from the sensor, or within a minimum distance of the configured boundary. The manual validation of these conditions also may be a challenging task for the operator.

SUMMARY

In one aspect of the teachings herein, a 3D imaging apparatus uses a "texture light tool" or facilitates the use of such a tool by an operator, to add artificial texture to a scene being imaged, for 3D imaging of surfaces or background regions in the scene that otherwise lack sufficient texture for determining sufficiently dense 3D range data. In at least one embodiment, the 3D imaging apparatus provides for iterative or interactive imaging, such as by dynamically indicating that one or more regions of the scene require artificial texturing via the texture light tool (also referred to simply as "texture tool") for accurate 3D imaging, and then indicating whether or not the addition of artificial texture cured the texture deficiency and/or whether any other regions within the image require additional texture.

As an example, "3D imaging" connotes the apparatus calculating 3D range data corresponding to surfaces or background regions within its field of view. In at least one embodiment, the teachings herein provide a method of 3D imaging implemented in an apparatus that includes a stereoscopic or multi-view imaging system. The method includes capturing multi-view image data for a field of view of the multi-view imaging system and evaluating the multi-view image data to identify any background regions lacking sufficient texture for determining 3D data. Such regions are regarded as low-texture regions. As an example, the apparatus may require that 3D range data be determinable at a given density across the full field of view.

According to one embodiment of the method, in the case that one or more low-texture regions are identified, output data or signals are generated to control the texture tool or to guide the user controlling the texture tool, for projecting a synthetic texture into the one or more low-texture regions. In such cases, it will be understood that either the apparatus includes and controls the texture tool, or that the user is in possession of a texture tool for projecting texture into the low-texture regions. In at least one embodiment, the apparatus includes a texture tool (e.g., a texture light projector) that either floods the field of view with a texture pattern, or the apparatus aims (e.g., by panning/tilting/zooming) the texture tool as needed to illuminate the low-texture regions. In another embodiment, the user is equipped with such a texture tool, which may be, for example, a handheld light with on/off and possibly other controls (such as a synthetic pattern selection control).

In either case, the method continues with the apparatus capturing multi-view image data at least for the one or more low-texture regions while illuminated with the synthetic texture, and determining whether sufficient texture has been provided for 3D ranging of the low-texture areas. If so, the method continues with updating the corresponding 3D range data for the low-texture areas.

Conversely, if sufficient texture has not been provided for any low-texture region, the method in one embodiment includes generating further output data or signals to indicate that case to the user and/or generating further output or data signals to again control the texture tool or guide the user in controlling the texture tool, for projecting the synthetic texture into the low-texture region or regions where sufficient texture was not provided. In the case where the texture tool is operated by the apparatus, the apparatus attempts to illuminate at least the low-texture regions for which sufficient texturing has not been provided. For example, to the extent that the texture tool provides multiple patterns and/or intensity control, the apparatus may try various patterns and/or intensities, as it attempts to acquire 3D information for the low-texture regions.

In another embodiment disclosed herein, an apparatus includes a stereoscopic or multi-view imaging system and is configured to perform 3D imaging. The apparatus comprises one or more processing circuits that are configured to capture multi-view image data for a field of view of the multi-view imaging system and evaluate the multi-view image data to identify any background regions lacking sufficient texture for determining 3D range data. These processing circuits and other associated circuitry within the apparatus may comprise dedicated hardware circuits, or programmable circuits, or some combination of both. In at least one embodiment, the processing circuits comprise one or more microprocessor circuits that are configured according to the execution of computer program instructions stored in a computer-readable medium, such as non-volatile memory within the apparatus.

Regardless of the implementation particulars, in the case that one or more low-texture regions are identified, the processing circuit(s) of the apparatus are, in one embodiment, configured to generate output data or signals to control the texture tool or guide the user controlling the texture tool, for projecting a synthetic texture into the one or more low-texture regions. For example, it may be assumed that the user has a texture tool for projecting texture into the low-texture regions, in which case the apparatus generates output data or signals that guide the user—e.g., indicate that synthetic texture is required and/or indicate to the user where such synthetic texture is required. In another embodiment where the apparatus includes and controls the texture tool, the apparatus uses the texture tool to project texture at least into the low-texture regions.

The apparatus is configured to capture multi-view image data at least for the one or more low-texture regions while illuminated with the synthetic texture, as provided by the texture tool, and determine whether sufficient texture has been provided for 3D ranging of the low-texture areas. If so, the apparatus updates the background range information corresponding to the low-texture areas. If sufficient texture has not been provided for any low-texture region, the apparatus is further configured to generate further output data or signals, to indicate that case to the user and/or generate further output or data signals to again guide the user in projecting the synthetic texture into the low-texture region or regions where sufficient texture has not been provided. Alternatively, in embodiments where the texture tool is operated by the apparatus, e.g., in embodiments where the apparatus incorporates a light-emitting device for projecting synthetic textures, the apparatus may repeat the steps of projecting synthetic texture into its field of view and determining whether the synthetic texture allows for accurate ranging of the low-texture background regions.

Once (sufficiently) dense background range information is obtained for the field of view, the configuration algorithm implemented by the apparatus can (a) configure boundaries with respect to background structure at each location (e.g., maintain a particular distance from the background), or (b) verify that the background distance is within the allowable limits at each location in the field of view, and/or (c) verify that the configured boundaries are projective in nature, i.e., no shadowing.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
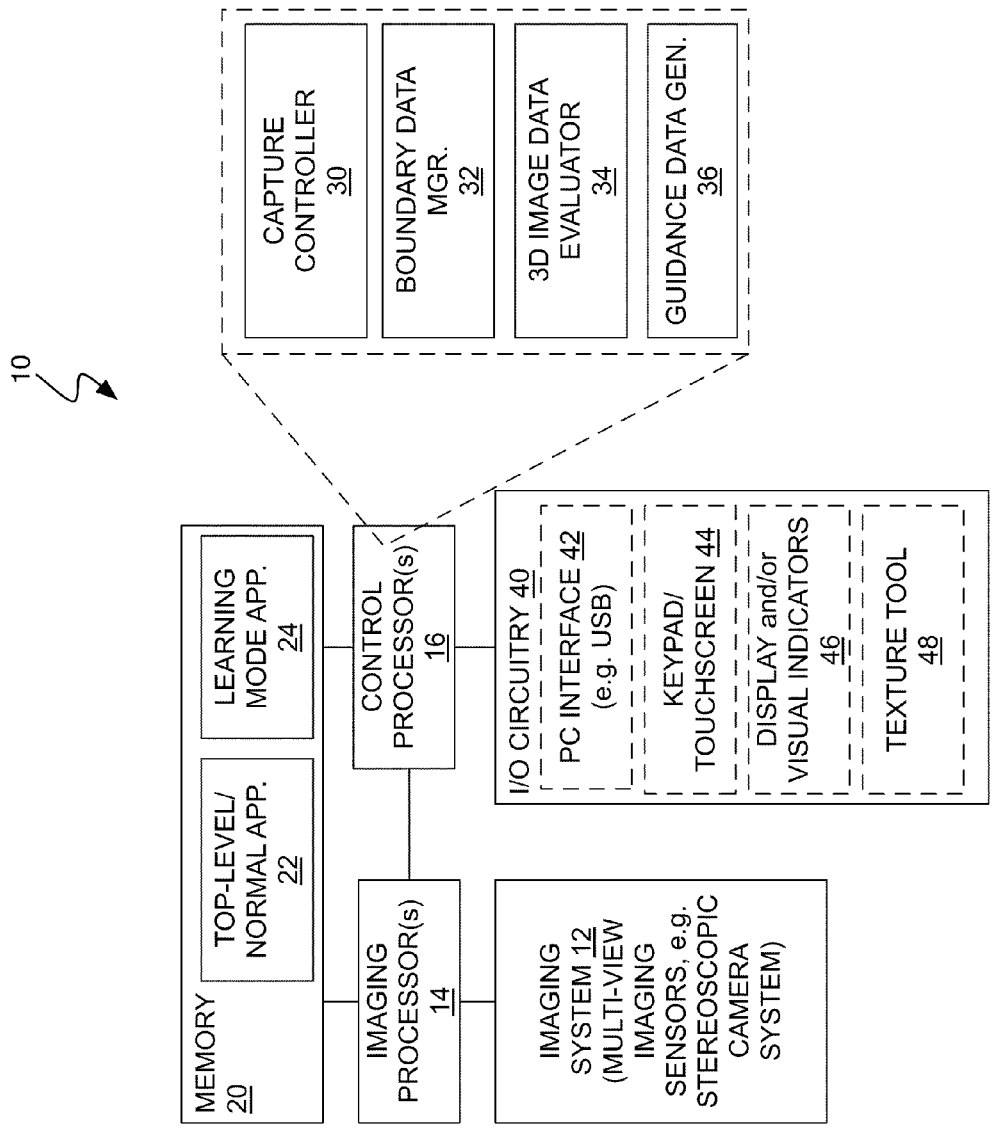
FIG. 1 is a block diagram of one embodiment of an apparatus that includes a machine vision system.

FIG. 1 illustrates one embodiment of a machine-vision apparatus 10, as contemplated herein. The illustrated apparatus 10 comprises a (machine) imaging system 12 having multi-view capability (e.g., a stereoscopic camera system) that allows it to capture image data from its field of view from two or more perspectives. The multi-view imaging system 12 further includes or is associated with one or more image processors 14, which may be dedicated vision processing resources, or which may be integrated within one or more control processor(s) 16, which are also included in the apparatus 10. The latter option is attractive in low-cost systems and/or in instances when the control processor or processors 16 are sufficiently powerful or are otherwise specially adapted for carrying out linear processing or other numeric algorithms used for machine vision.

In one or more embodiments, the control processor(s) 16 comprise one or more microprocessors, microcontrollers, digital signal processors, ASICs, FPGAs, or other digital processing circuits. In the case that the image processor(s) 14 and/or the control processor(s) 16 are implemented using programmable digital processors, such as in one or more microcontrollers and/or DSPs, it will be understood that such programmable digital processing circuitry is specially adapted to carry out the processing methods presented herein, based on its execution of stored computer program instructions. That is, the image and control processors 14 and 16 are configured as a particular machine—i.e., as particularized processing circuits—based on the execution of one or more stored computer programs held in the illustrated memory 20, or another computer-readable medium that is accessible to the image and/or control processors 14 and 16.

As an example arrangement, the illustration depicts a top-level or "normal" application 22, which may comprise the top-level functionality of the apparatus 10, such as its operation as a machine-guarding sensor, or other 3D volume-monitoring sensor. The depicted "learning mode" application 24 may be a subset or adjunct of the top-level program 22. In this example configuration, the learning mode application 24 is invoked for the initial setup or re-configuration of the apparatus 10. It will be understood that the memory 20 may hold other data, such as learned range information for monitored backgrounds, etc., associated with operation of the apparatus 10 in a machine-guarding or other 3D volume-monitoring installation. In this regard, the memory 20 may comprise more than one memory circuit and/or more than one type of memory—e.g., it may include RAM and ROM or EPROM (or EEPROM or FLASH). Note, too, that the image and control processors 14 and 16 may include on-chip memory, for working data and/or program storage.

According to further details in the example embodiment of the apparatus 10, the control processor(s) 16 include a capture controller 30, a boundary data manager 32, a 3D image data evaluator 34, and a guidance data generator 36. Note that these circuits may be programmatically realized as functional elements via the execution of computer program instructions by the control processor(s) 16. Of course, some or all of these circuits may be implemented in dedicated circuitry, or some combination of dedicated circuitry and software-based circuitry. Further, there may be overlap between some of the image-related processing performed by the image processor(s) 14 and by the control processor(s) 16, and it will be understood that the particular image processing implemented by the image processor(s) 14 will depend on the imaging system arrangement used. In the case that the multi-view imaging system 12 is a stereo camera based system—i.e., two or more cameras with overlapping fields of view—known stereo imaging algorithms for machine vision and 3D range extraction may be used by the apparatus 10.

The illustrated apparatus 10 further includes input/output (I/O) circuitry 40, including any one or more of: a PC interface 42, such as a USB interface; a keypad/touchscreen 44; a display and/or set of visual indicators 46, and a texture tool 48, which is a light source configured to project "synthetic texture" onto a surface that otherwise lacks sufficient natural texture for 3D range/feature extraction by the multi-view imaging system 12 and associated image processors 14 of the apparatus 10.

Thus, in at least one embodiment, the apparatus 10 is configured to evaluate a 3D scene as captured by the multi-view sensors of its multi-view imaging system 12, and determine whether any portions of that 3D scene lack sufficient natural texture for 3D range determination. If so, the apparatus 10 activates its included texture tool 48, to project synthetic texture into the low-texture regions within its field of view. In one example, the texture tool 48 provides a flood pattern that generally illuminates the field of view and "aiming" of the texture tool 48 generally is not required. In another embodiment, the texture tool 48 is more directional, and the apparatus 10 uses pan/tilt/zoom control to direct the projection of synthetic texture into the specific portions of its field of view that lack sufficient natural texture for 3D ranging.

In this regard, it will be understood that the apparatus 10 in at least one embodiment is configured to evaluate digital data sets representing the image captured from each perspective provided by its multi-view sensors, e.g., according to known stereoscopic vision processing algorithms, and determine whether any portions of such images or a composite image obtained therefrom cannot be accurately ranged. If the texture tool 48 is directional, the apparatus 10 determines the pan/tilt settings needed to aim the texture tool 48 towards a low-texture region within its field of view, and then recaptures image data for at least the low-texture region while synthetic texture is being projected into the low-texture region. (Note that there may also be "zoom" control for the texture tool 48, which can be used to increase or decrease the size of its illumination beam.)

The apparatus 10 evaluates the newly captured image data and repeats the process for other low-texture regions as needed, or repeats the process for the same low-texture region until adequate range information is developed, or until a programmatic limit on the number of repetitions is reached. As part of these operations, the apparatus 10 may change the type and/or pattern of synthetic texture being projected by the texture tool 48.

Figure 2B:
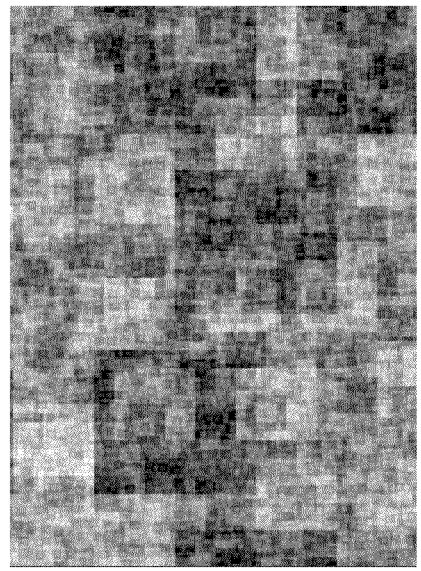
FIGS. 2a-2c are diagrams of example synthetic texture patterns, as might be projected by a texture tool that is configured to project patterned light, for artificially adding texture to a scene imaged by a machine vision system.
Figure 2C:
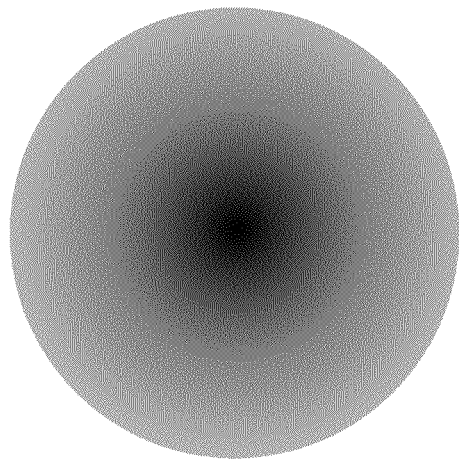
Figure 2A:
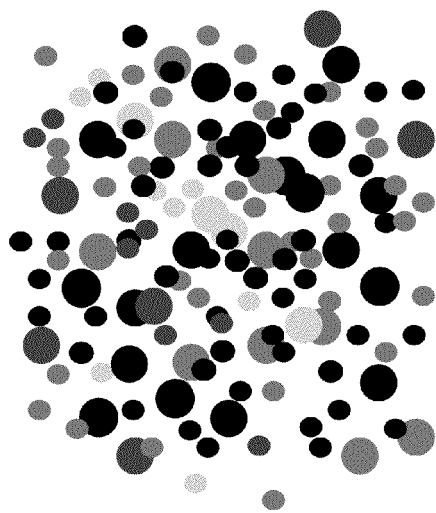

See FIGS. 2a-2c, for example. FIG. 2a illustrates a synthetic texture pattern based on an array of "dots" of light. The dots may be arranged in a random pattern and may include dots of varying sizes and illumination intensities. Such an array is created using an array of LEDs, for example, or is created using a common light source projected through a mask printed or otherwise formed with the desired dot pattern. FIG. 2b illustrates another synthetic texture pattern, comprising a multi-scale texture pattern that can be generated with a diffraction grating. Still further, FIG. 2c illustrates yet another contemplated pattern, comprising an intensity-falloff pattern, such as may be generated with a flashlight-like beam.

The texture tool implementation can be realized in several different ways. One possible implementation consists of a desired arrangement of light emitting diodes (LEDs) that could provide a texture pattern which could be projected on the scene. In another variation, a strong light source (e.g., a flash light) with or without a modified pattern filter in front can be used to generate scene texture. Alternatively, a strong laser light source can be transmitted through a patterned diffraction grating that can produce the desired scene texture as well. Furthermore, with the advent of new and affordable hand-held projector technology, systems can generate dynamic texture patterns with high resolutions, as desired. A few examples of the projected texture patterns are shown in FIGS. 2a, 2b, and 2c.

Independent of a particular implementation of the texture tool 48 (also referred to as a "texture brush"), the tool 48 should have to emit enough energy such that the synthetic texture projected by it onto a given surface is reflected with sufficient intensity that it can be measured or otherwise reliably sensed or detected by the apparatus 10. In other words, the texture tool should project synthetic texture with sufficient intensity to produce meaningful variations in the image data captured by the apparatus 10 for the region(s) illuminated by the texture tool 48.

The projected patterns should be designed to facilitate robust feature correspondence across views by ensuring that the local neighborhoods of image data within corresponding sets of image data have unique signatures so that they can be unambiguously matched across different views. This ability to correlate texture patterns in images taken from different angles/views of the multi-view imaging system 12 requires the texture patterns to be non-repeating within the matching window employed by the correspondence algorithms.

Furthermore, the texture pattern should contain textures at multiple scales/resolutions since the synthetically textured scene surface can be at varying distances from the apparatus 10. The generated texture pattern can be either random or structured depending on the particular implementation of the texture tool 48 and the stereo correlation algorithm.

Another advantage of one or more embodiments disclosed herein is that the texture tool 48 does not need to be calibrated with respect to the apparatus positions. Furthermore, the texture pattern/signal generated by the texture tool 48 does not need to be identified separately by apparatus 10, nor does the particular nature of the texture pattern projected by it need to be known a priori to the apparatus 10. Rather, the texture tool 48 simply produces additional scene features that facilitate the view correspondence between multiple views of the same scene as acquired by multiple imaging sensors or devices within the multi-view imaging system 12 of the apparatus 10, and therefore improves the 3D ranging performance of the 3D vision algorithms implemented by the apparatus 10. These benefits inure independent of the particular machine vision algorithms implemented by the apparatus 10.

Even with the application of synthetic texture 58, there still may be small portions within the image scene represented by its field of view 54 that are not "rangeable" because of self-occlusion problems caused by 3D objects or features within the scene. Such occlusion problems are common to multi-view triangulation-based imaging systems. Put simply, there may be shadowed areas within a scene that are not seen by the apparatus 10. Similarly, some parts of the scene that are at large distances from the apparatus 10 may not be able to reflect sufficient energy from the texture tool 48 back to the apparatus 10, thus leaving a possibility of gaps or holes in the 3D range map generated by the apparatus 10 for the imaged scene background represented by its field of view 54.

Notably, the texture tool 48 in one or more embodiments provides for more than one type of synthetic texture and provides for manual or automated changeover from one pattern to another. The texture tool 48 in one or more embodiments also may be configured to vary the pattern particulars, even within one type of pattern, e.g., by changing from one dot pattern to another, or by changing from one multi-scale texture pattern to another. In a manual embodiment, the texture tool 48 may have a selection ring or dial that allows the operator (a human user) to vary the pattern and/or pattern type. In an automated embodiment, such as where the texture tool 48 is incorporated as a controlled element of the apparatus 10, the apparatus 10 generates control signaling to activate the texture tool 48 and, optionally, to vary the pattern and/or pattern type of the synthetic texture projected by the texture tool 48.

For example, the capture controller 30 controls the multi-view imaging system 12 directly, or indirectly through the imaging processors 14, to capture one or more 3D scenes associated with a defined monitoring volume having associated boundary data, which may be managed by the boundary data manager 32. Such data may be provided to the apparatus 10 by an operator using the keypad/touchscreen 44 and/or through the PC interface 42, which may connect the apparatus 10 to a laptop computer or other PC running a configuration application, or otherwise providing an interactive interface with configuration software running on the apparatus 10.

In any case, the apparatus 10 acquires imaging data, which may comprise post-processed digital images output by the image processor(s) 14. That is, the image processor(s) 14 may be configured to process "raw" sensor data from the multi-view sensors included in the multi-view imaging system 12, to produce digital image data for evaluation by the 3D image evaluator 34. In turn, the 3D image evaluator 34 is, in one or more embodiments, configured to determine whether any regions within the 3D scene represented by the digital images lack sufficient texture for accurate determination of 3D range. If so, the guidance data generator 36 in one or more embodiments generates guidance signals, which, in embodiments where the apparatus 10 incorporates and controls the texture tool 48, may be understood as control signals for activating the texture tool 48 and controlling it as needed.

Figure 3:
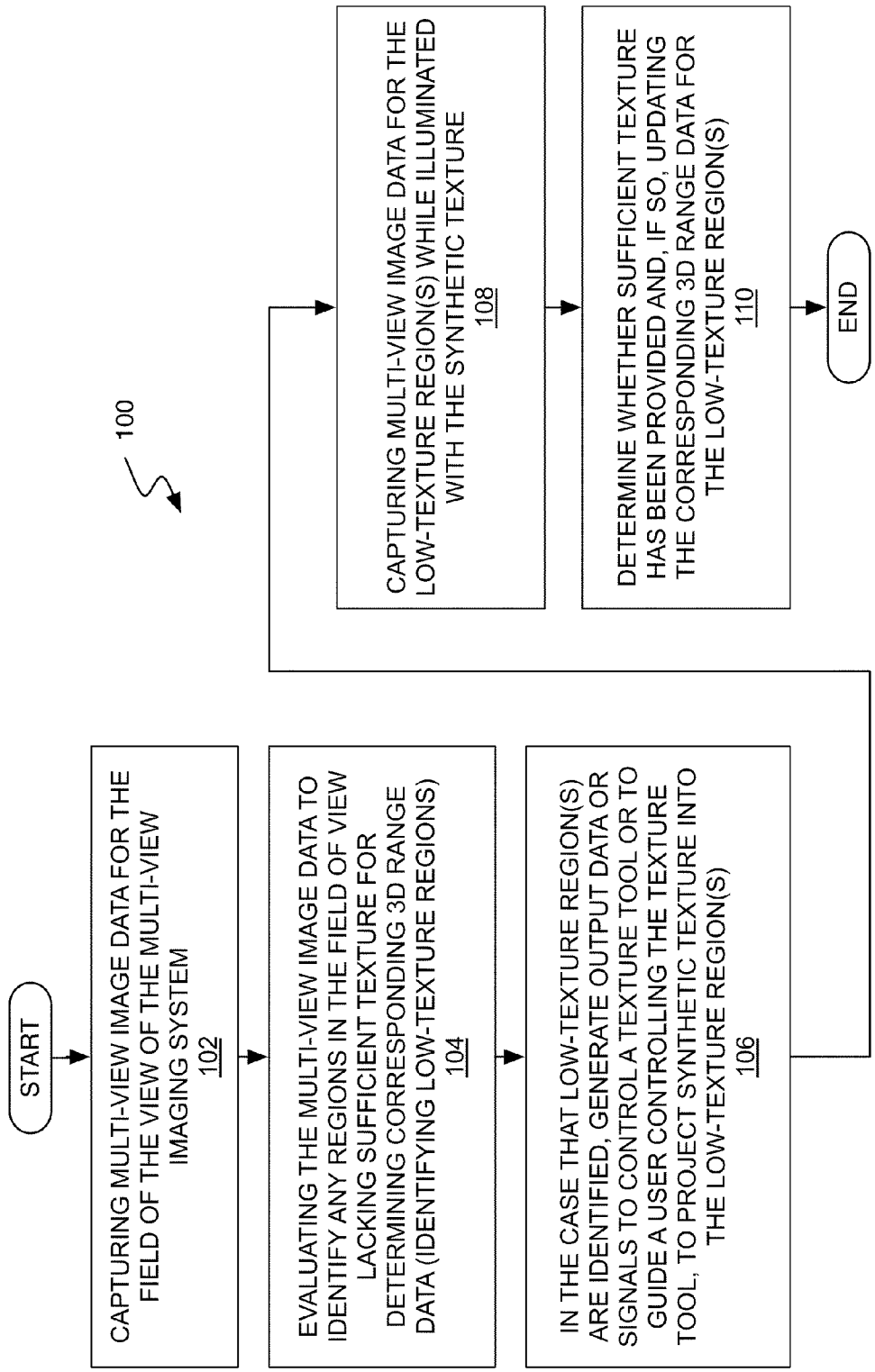
FIG. 3 is a logic flow diagram of one embodiment of obtaining 3D range data for a scene imaged by the apparatus of FIG. 1, for example, wherein one or more regions within the field of view lack sufficient "natural" texture for 3D ranging, and where synthetic texture is used to obtain 3D range data for such regions.

FIG. 3 illustrates an example embodiment of one method of 3D imaging implemented in the apparatus 10, which includes a stereoscopic or other type of multi-view imaging system 12. The illustrated method 100 includes capturing multi-view image data for a field of view of the multi-view imaging system (Block 102), and evaluating the multi-view image data to identify any regions in the field of view lacking sufficient texture for determining corresponding 3D range data, which regions are regarded as low-texture regions (Block 104).

In the case that one or more low-texture regions are identified, the method 100 includes generating output data or signals to control a texture tool 48 or to guide a user controlling the texture tool 48, to project synthetic texture into the one or more low-texture regions (Block 106). Correspondingly, the method 100 includes capturing multi-view image data at least for the one or more low-texture regions while illuminated with the synthetic texture (Block 108), and determining whether sufficient texture has been provided for 3D ranging of the low-texture regions and, if so, updating the corresponding 3D range data for the low-texture regions (Block 110).

The method 100 may include preceding operations, such as where a user inputs data to the apparatus 10, corresponding to desired monitoring boundaries, or where the apparatus 10 "learns" boundary information. For example, the method 100 may be extended to include succeeding operations, such as configuring monitoring boundaries in the field of view, using the 3D range data acquired by the apparatus 10 for its field of view, including using the updated 3D range data corresponding to the low-texture regions. Still further, the method 100 may be extended to include verification of the configured monitoring boundaries by the apparatus 10. Selected example embodiments of such aspects are detailed later herein.

Figure 4:
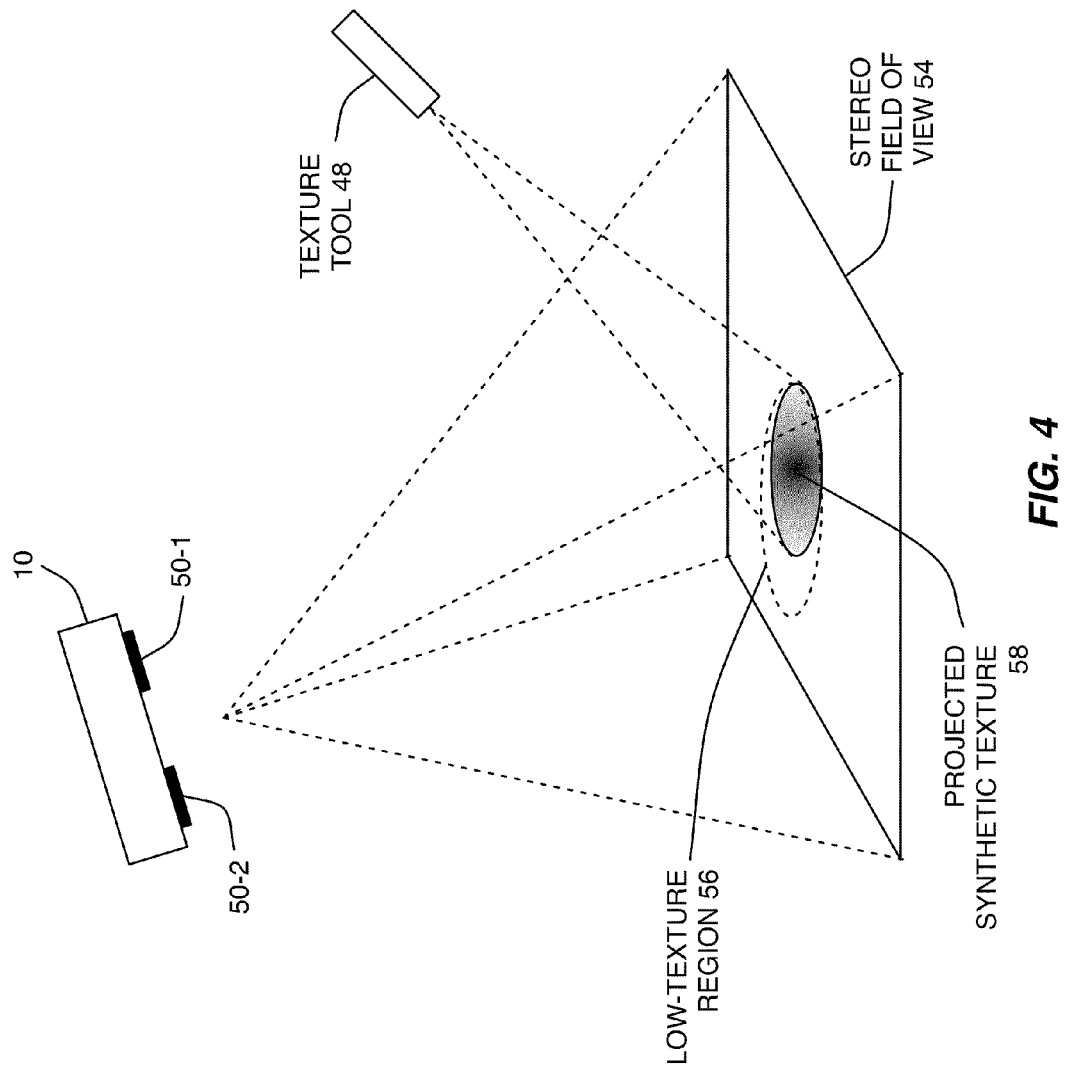
FIG. 4 is a diagram of one embodiment of the apparatus of FIG. 1, for example, and the projection of synthetic texture onto surfaces within its field of view.

In one or more other embodiments, the apparatus 10 does not incorporate the texture tool 48. Instead, the texture tool 48 is used by an operator to project synthetic texture into low-texture regions. See FIG. 4, for an example of this arrangement. In FIG. 4, one sees that the illustrated embodiment of the apparatus 10 includes stereo cameras 50-1 and 50-2, which will be understood to function as the multi-view sensors of its included multi-view imaging system 12.

The stereo cameras 50-1 and 50-2 have an overlapping field of view 54, which includes a low-texture region 56. The 3D image data evaluator of the apparatus 10 identifies the low-texture region 56 based on its processing of acquired digital image data for the 3D scene included within its stereo field of view 54. Correspondingly, the guidance generator 36 generates guidance signals—e.g., directions and or visual indicators—for guiding the operator as to where to aim the texture tool 48, so that the operator projects synthetic texture 58 onto the low-texture region 56.

Broadly, an algorithm contemplated herein for generating a dense 3D range map for an imaged scene relies on use of the texture tool 48. As a first step, the apparatus 10 captures the scene via its multi-view imaging system 12 and processes the image data to determine initial range information—e.g., to determine an initial 3D range map representing range data for the scene. This may be understood as developing range data for pixels within 2D images captured by two or more cameras within the multi-view imaging system 12. The initial ranging is done without application of synthetic texture 56 via the texture tool 48.

The apparatus 10 evaluates the initial data and identifies regions within the scene that contain no range information due to the lack of sufficient texture—e.g., it identifies low-texture regions 56 within its field of view 54. For each low-texture region 56, the apparatus 10 guides an operator or other user to use the texture tool 48 to project synthetic texture 58 onto one or more of the low-texture regions 56. Correspondingly, the apparatus 10 may adjust its multi-view imaging system 12, to avoid signal saturation that could arise if significant light is reflected from the surface(s) in the scene that is illuminated by the texture tool 48. Likewise, the algorithm in one or more embodiments ignores non-relevant parts of the scene by focusing processing on the low-texture regions 56, thus making it more robust (less sensitive) to unwanted interferences due to dynamic elements of the scene (e.g., the user handling the texture tool 48). In any case, the apparatus 10 updates the scene range information while the synthetic texture 58 is being projected onto the scene object surfaces. The apparatus 10 may guide the user further if more observations are required and it stops such guidance when the 3D range image contains sufficiently dense, valid, range measurements (or when some limit on the number of ranging attempts is reached).

Figure 5:
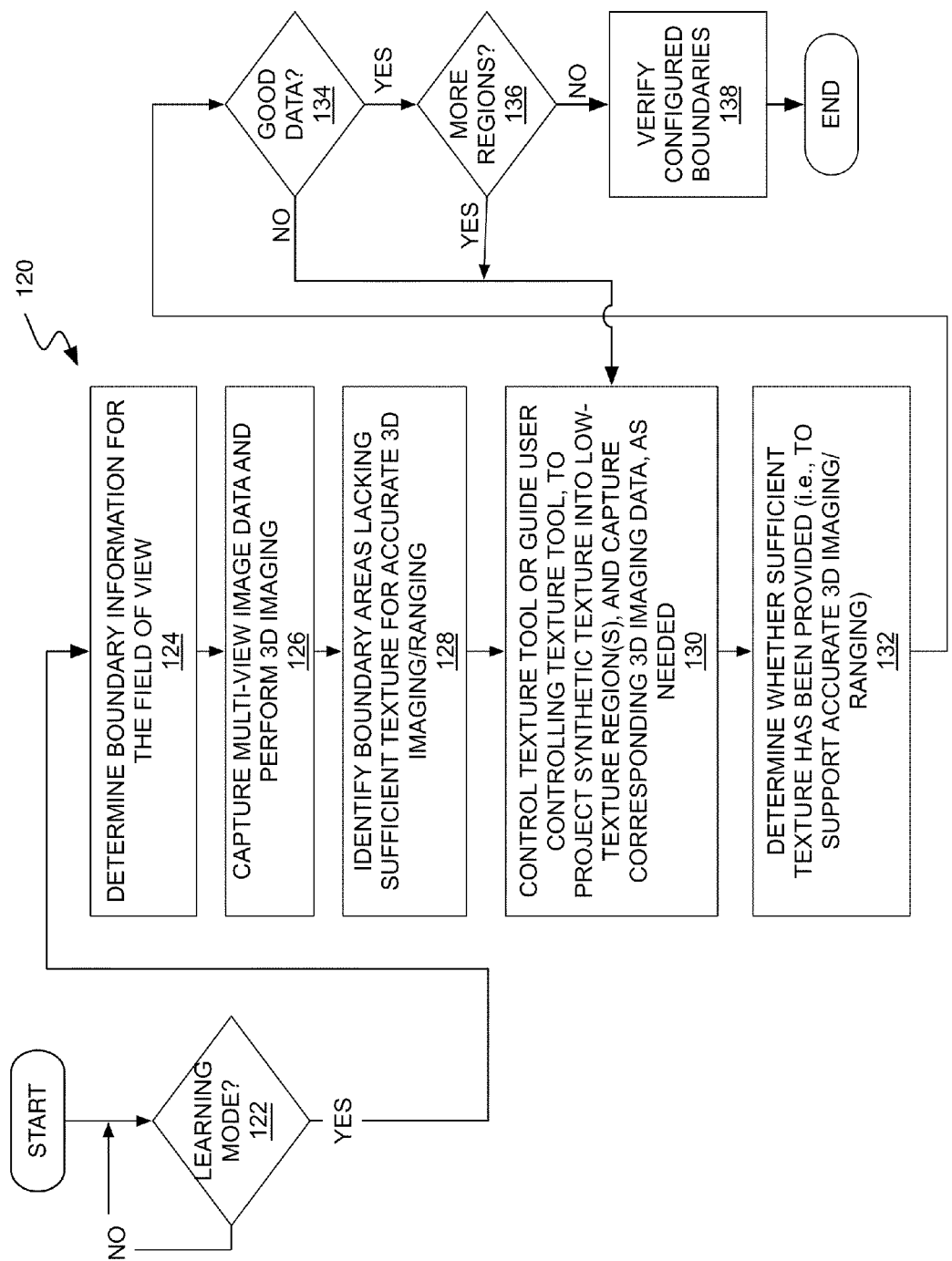
FIG. 5 is a logic flow diagram of another embodiment of a method of obtaining 3D range data for a scene imaged by the apparatus of FIG. 1, for example, wherein one or more regions within the field of view lack sufficient "natural" texture for 3D ranging, and where synthetic texture is used to obtain 3D range data for such regions.

With the algorithm above in mind, FIG. 5 provides an example of one embodiment of a method, which can be considered a variation or extension of the earlier-described method 100. Here, the illustrated method 120 is based on the assumption that (desired) monitoring boundaries are manually entered into the apparatus 10 by a user, or otherwise loaded into the apparatus 10. The apparatus 10 then captures a dense range map for its field of view, to verify the boundaries.

In more detail, the method 120 represents an operational algorithm implemented by the apparatus 10, in which low-texture regions 56 are identified and in which corresponding texture tool guidance is provided to an operator (user), or, in the case where the texture tool 48 is integrated into the apparatus 10, the apparatus 10 controls the texture tool 48. The apparatus 10 carries out the processing embodied by the illustrated logic flow diagram, for example, by executing stored computer program instructions via the earlier-illustrated and described control processor(s) 16.

The illustrated and non-limiting example method 120 includes determining whether or not to enter the learning mode (Block 122). Here, the diagram is simplified by indicating an "endless" loop where the apparatus 10 repeatedly checks whether it should enter the learning mode. It will be understood that such repeated checking may be done during the course of normal run-time operations—e.g., the learning mode check may be performed while the apparatus 10 is executing its top-level/normal application, which provides for area monitoring. Of course, if the apparatus 10 lacks proper configuration for operating according to its normal application, it may automatically enter the learning mode. Otherwise, it may monitor for an input signal received through its I/O circuitry 40, indicating that it should enter its learning mode of operation. This may comprise reading or otherwise detecting an externally generated signal and/or determining whether an authorized code has been input to the apparatus 10.

Once the learning mode is activated (YES from Block 122), processing continues with determining boundary information for the field of view (Block 124). This step may comprise the apparatus 10 deriving boundary information automatically, based on capturing data for its current field of view 54, or may comprise it reading one or more configuration files and/or receiving user input, or it may comprise a combination of both. Thus, the next step of capturing image data and performing 3D image processing (Block 126) may be subsumed in the step of determining boundary data.

Processing then continues with the apparatus 10 determining whether any boundary areas lack sufficient texture (Block 128). Here, "sufficient" connotes that minimum level of texture needed to support accurate spatial processing of the image data, for determination of range information. While some deterministic lower minimum exits for discernable texture in dependence on the resolution of the apparatus' multi-view imaging system 12 and on the 3D algorithms involved, the practical meaning of "sufficient texture" depends on the level of reliability and accuracy needed for the application at hand, as will be immediately understood by those of ordinary skill in the art.

Processing then continues with the apparatus 10 controlling the texture tool 48 or guiding the user in controlling the texture tool 48, to project synthetic texture into (the identified) low-texture regions 56 and capturing updated image data, as needed. (Block 130). "Guiding" the user in an example embodiment comprises providing on-screen instructions or other visual guidance, for example, and the apparatus 10 may provide feedback data as to the user's actual-versus-desired positioning of the synthetic texture. For example, the apparatus 10 may cause a visual depiction of its field of view 54 to be displayed—either an actual field of view image or a simplified schematic thereof. In such cases, the apparatus 10 may illustrate where the projected synthetic texture 58 is currently sensed within the field of view 54 and/or depict where the low-texture region 56 lies within the field of view 54.

Processing continues with the apparatus 10 determining whether sufficient texture has been provided (Block 132). If the new image data is not good (NO from Block 134) the apparatus 10 can repeat the texture tool control or guiding and determining steps (Blocks 130 and 132), as needed. Further, as the user may be able to illuminate only a relatively small portion of the field of view 54 at any given time using the texture tool 48, the apparatus 10 checks whether more low-texture regions 56 remain (Block 136).

That is, the apparatus 10 checks whether there are any other low-texture regions 56 for which it should illuminate with the texture tool 48, or direct the user to illuminate using the texture tool 48. If so (YES from Block 136), the apparatus can repeat the guiding and determining steps (Blocks 130 and 132), as needed, but where the guidance generated is updated for each such low-texture region 56. Further, in one or more embodiments, the apparatus 10 is configured to provide or display updated boundary information, showing the progressive completion of 3D imaging/ranging of the boundary.

That is, the apparatus may "fill in" displayed background information with good data, in response to acquiring 3D range data from the synthetic textures 58 projected by the user, thus allowing the user to see progress being made as regards filling in the low-texture areas 56 (where "filling in" can be understood as providing sufficient texture for the apparatus 10 to acquire 3D range information for the low-texture regions 56). This can be done by the apparatus 10 displaying (or providing data for externally displaying) a representation of the field of view 54 with relative locations of low-texture regions 56 highlighted or otherwise indicated, and updating the display information as low-texture regions 56 are successfully ranged using the synthetic texture 58 projected from the texture tool 48.

If there are no more low-texture regions 56 that require illumination (NO from Block 136), the method 120 continues with the apparatus 10 verifying the configured boundaries (Block 138). Examples of boundary verification processing are discussed in more detail later herein.

In the above processing, determining that image data is not "good" with respect to the evaluation represented by Block 134 comprises the apparatus 10 determining that insufficient texture has been provided by the user using the texture tool 48, with respect to one or more of the regions identified as low-texture regions 56. Note, too, that the apparatus 10 can be configured to repeatedly guide the user to project synthetic texture 58 onto a given low-texture region 56, until that region is successfully ranged by the apparatus 10, or subject to some configured limit on the number of such attempts. Further, if repeated attempts are required, the apparatus 10 may guide the user to change the texture projection angle and/or change the synthetic texture 58 being projected (assuming that the texture tool 48 allows the user to make such changes).

In one working example, a user first enters boundary information using a PC tool and then the apparatus 10 captures 3D/range information for the specified boundaries and guides the user to add texture where needed. Alternatively, the apparatus 10 performs or otherwise supports the boundary definition step based on capturing (initial) 3D/range information, and then identifying detected regions of low texture.

As for determination of the low-texture regions 56, in one or more embodiments, the apparatus 10 identifies low-texture regions 56 within its current field of view, for example, by: analyzing 2D images—e.g., 2D images from individual ones of its cameras—to detect regions with low contrast variations in a neighborhood of image data (e.g., pixel data). An example ad hoc metric for texture at location (x,y) can be defined as $$\sum_{i=-3}^{3} \sum_{j=-3}^{3} \|\|L(x-i, y-j) - L(x, y)\| > Th\|$$

where, L(x,y) denotes the absolute intensity value in the 2D image at pixel location (x,y) and Th equals a threshold value.

The above equation evaluates a 7×7 neighborhood around the given point (x,y) to calculate a local texture metric in that region. The inner term, |L(x−i,y−j)−L(x,y)|, measures the absolute difference of intensity of a neighboring pixel (x−i, y−j) to that of the reference pixel (x,y). The metric defined in the above equation is equal to the number of pixels that are sufficiently different (i.e., the absolute intensity difference is above the threshold Th) from the center (reference) pixel. A larger number of these sufficiently different pixels in a neighborhood denotes a good texture metric. Similarly, regions with a low value of this metric would be considered "textureless."

Additionally, the apparatus 10 would analyze the corresponding regions in a given range image to validate the detected "textureless" regions. Textureless regions thus can be understood as lacking sufficient image features from which valid 3D measurements can be computed. As noted, in at least one embodiment, the apparatus 10 includes the texture tool 48, and is configured to control the texture tool 48 to add texture where needed, in automated fashion. In at least one such embodiment, the apparatus 10 integrates a texture tool 48 that it selectively activates, for example, in a learning mode. In one or more other embodiments, execution of the learning-mode application 24 causes the apparatus 10 to capture image data from its field of view 54, perform 3D analysis of that data, and identify areas within the field of view 54 that lack sufficient texture for accurate 3D imaging. Further, according to its execution of the learning-mode application 24, the apparatus 10 interacts with and directs the user—typically an installer or other authorized person—to use a texture tool 48, such as a handheld projector, to project synthetic textures 58 into the identified low-texture regions 56.

In one example embodiment, the apparatus 10 communicates with an attached PC (e.g., a laptop computer) as part of this process. For example, the attached PC runs a program, which may be a standalone program configured to transfer data between it and the attached apparatus 10, or which may be a browser-based program or other applet that is provided or otherwise supported by the apparatus 10.

In any case, the apparatus 10 transfers information to the attached PC, identifying those areas within its field of view 54 that lack sufficient texture for accurate 3D imaging and corresponding ranging. As an example, the apparatus 10 transfers field-of-view/background data, with the low-texture regions 56 highlighted. That display may then be automatically updated (e.g., in real-time or near real-time) as the user projects synthetic textures 58 into the low-texture regions 56, using the texture tool 48. Additionally or alternatively, the I/O circuitry 40 of the apparatus 10 may include one or more user interface elements, such as a keypad and display (note that a touch screen may be used to provide both display and input capabilities). These interface elements, such as the keypad/touchscreen 44 and display/visual indicators 46 shown in FIG. 1, may replace or supplement an attached PC.

Thus, in one or more embodiments, the apparatus 10 senses the projected synthetic textures 58 automatically, performs the requisite image analysis, determines whether sufficient background ranging accuracy has been achieved, and then sends back information to the PC (or its own display), to update that portion of the background data. In this manner, the user is appraised of which background areas still require the addition of synthetic texture 58. Note, too, that the display can be used to guide the user's projection of synthetic texture 58, such as by highlighting the area or region 56 where such insufficient texture is detected and providing arrows or other guidance for positioning the synthetic texture 58 where needed, indicating when capture is being performed, etc.

Accordingly, in one or more embodiments, the apparatus 10 is a type of stereoscopic monitoring system, and it provides for a method for verification of monitoring boundaries used with stereoscopic monitoring systems. The apparatus 10 in such embodiments uses two or more imaging devices (e.g., cameras 50) configured so that multiple-view correspondence algorithms can be used by the apparatus to determine the positions of objects entering its field of view (FOV). The apparatus 10 is configured to compare the positions of objects entering the FOV against a predefined monitoring boundary, and to make a decision as to whether or not the detected object is inside of the predefined monitoring boundary. Note that multiple boundaries may be configured, such as a first or warning boundary, and a closer, intrusion boundary.

In general, the predefined monitoring boundaries are configured so as to not overlap with (or be shadowed by) static objects, surfaces or structures in the scene. However, the positions of static objects, surfaces or structures within the scene may not be measurable by the apparatus 10, owing to the lack of sufficient image contrast on the affected areas. Thus, in one or more embodiments, the apparatus 10 provides for a boundary configuration step in which its monitoring boundary or boundaries are configured, and a verification step.

For the verification step, the apparatus 10 identifies those areas within the scene in which the initial image data did not have sufficient texture information for computing 3D range information. The apparatus 10 uses a texture tool 48 to artificially illuminate these low-texture regions by projecting synthetic texture onto the surface(s) within those areas, wherein the synthetic texture comprises a pattern of varying light intensity having sufficient variation to produce valid depth measurements by the apparatus 10 for the low-texture regions. Note that the apparatus 10 may control the texture tool 48 directly, or a human operator may control the texture tool 48, in which case the apparatus 10 "guides" such usage by generating guidance/direction signals that indicate to the user where to point the texture tool 48, for projection of synthetic textures.

The apparatus 10 makes a comparison of previously undetected surface positions against the desired boundary surfaces, using the depth map determined by or otherwise updated using the range data obtained via addition of the projected synthetic textures. As noted, the synthetic texture is projected light in the form of an irregular pattern, and the apparatus 10 in one or more embodiments is configured to interact with a user, to guide the user's use of the texture tool 48. In some cases, the apparatus 10 will be able to compute 3D range data for an entire scene without requiring synthetic texture; in other cases, there may be multiple areas lacking sufficient natural texture.

Regardless, it will be appreciated that the apparatus 10 may be used as a machine vision system for monitoring a defined 3D volume. Non-limiting applications for the apparatus 10 include use for surveillance, security or machine safeguarding, wherein the purpose of the system is to detect objects intruding into a defined 3D volume. Such volumes are typically defined by programmed boundaries, which are determined by an operator during initial configuration and setup of the apparatus 10. In this context, the teachings herein provide significant advantages in the reliable configuration of such boundaries, in cases where one or more portions of the boundary areas lack sufficient natural texture for the apparatus 10 to determine 3D range information of sufficient accuracy and/or sufficient density. Here, one example of "sufficient density" is requiring that 3D range data be computable for some defined minimum number of range points regularly distributed within a given subarea of the multi-view image.

In any case, an apparatus 10 as contemplated for at least one embodiment herein simplifies the boundary setup process and facilitates safety validation of the boundary for a given application by conveniently learning a dense range map of the scene being monitored. In so doing, the apparatus 10 advantageously facilitates boundary learning by strategically using or guiding the use of a texture tool 48 to project synthetic textures 58, as needed, to obtain complete 3D range information.

An application in the domain of machine guarding and area monitoring may be required to learn a complete 3D scene range map during the initial setup, which could eventually be used by a user to define the protection/monitoring boundaries with respect to the 3D world coordinate system (e.g., using a configuration tool). The same 3D scene range map can also be used by the apparatus 10 to validate the selected protection/monitoring boundaries, based on it evaluating the 3D range map and identifying poorly or partially textured objects in the scene, along with a validation of their projective shadows.

In such an application, the apparatus 10 first analyzes the scene and obtains valid range measurements at the scene locations that contain sufficient texture. Thereafter, the apparatus 10 automatically identifies those regions in the scene that lack sufficient texture for it to produce usable range information. The apparatus 10 then directs the user to "add" texture to the identified low-texture regions, using a texture tool 48.

Under such direction, the user uses the texture tool 48 to project a light pattern into poorly textured parts of the viewed scene. The user can simply take the texture tool 48 and point it in the direction of the scene, thus, casting the projected pattern on physical surfaces and effectively "painting" a texture in the scene. Correspondingly, the apparatus 10 analyzes this "synthetic" texture by any one or more correspondence and triangulation algorithms—such as are known in the art—in order to generate valid range data for the texture-deficient portions of the scene. The process, as implemented by the apparatus 10, thereby produces a more complete 3D range map of the scene.

As one example, a user can first enter boundary information using a PC tool and then the sensor can capture 3D/range information for the background and then guide the user to add texture where needed. Alternatively, the sensor may perform or otherwise support the boundary definition step based on capturing (initial) 3D/range information, and then identifying detected regions of low texture.

One type of texture tool 48 provides a dense texture projection for the entire FOV. This type of tool has the advantage of "painting" the apparatus's entire FOV, and thus does not necessarily need to be moved or otherwise pointed at particular areas of low texture. Another type of texture tool 48, which may be less expensive and require less power, has a FOV smaller than the FOV of the apparatus 10—i.e., it does not simultaneously illuminate the entire FOV of the apparatus 10—and thus may need aiming, to provide texture in particular low-texture regions within the larger FOV of the apparatus 10. As such, the texture tool 48 may be a movable light source—e.g., with pan-tilt-zoom control—such that it can be aimed by the user subject to guidance from the apparatus 10, or otherwise moved automatically by the apparatus 10. Note, too, that the texture tool 48 may use visible or infrared light for texture projection.

Figure 6:
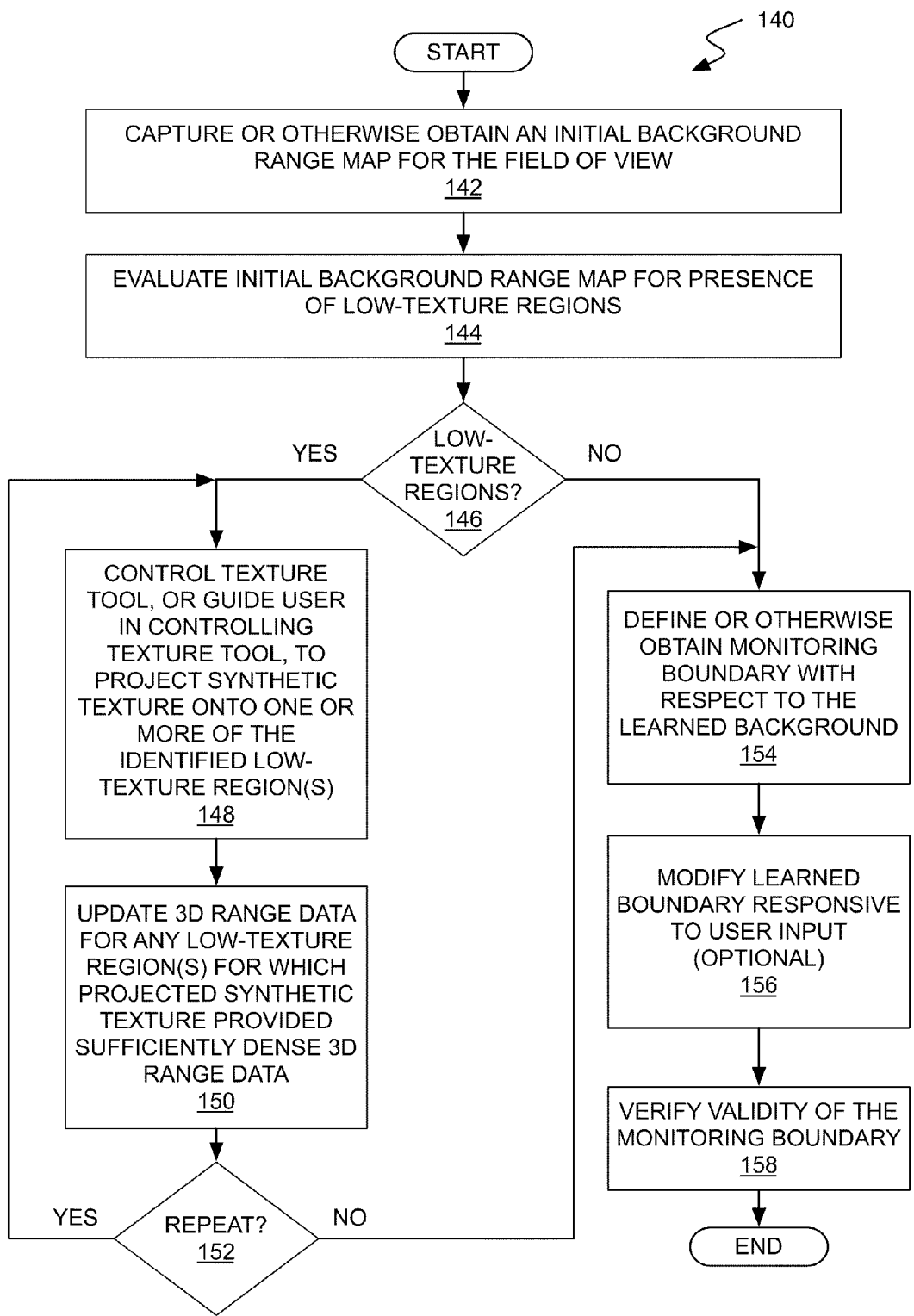
FIG. 6 is a logic flow diagram of yet another embodiment of a method of obtaining 3D range data for a scene imaged by the apparatus of FIG. 1, for example.

FIG. 6 illustrates another example logic flow diagram for one embodiment of an algorithm implemented by the apparatus 10, for carrying out the processing set forth immediately above, or for carrying out variations of it. Here, the illustrated method 140 illustrates processing carried out by the apparatus 10 in one or more embodiments, wherein it captures a dense range map of the scene and then uses the captured information to define, e.g., monitoring boundaries. Thus, such processing may be regarded as an "automatic" boundary-learning embodiment. For example, it may be activated or otherwise undertaken by placing the apparatus 10 into a "learning" or "configuration" mode. As an example, the apparatus 10 may enter configuration mode in response to a user connecting an authorized laptop computer to the apparatus 10, entering a predefined code into the user interface of the apparatus 10, or applying a defined control signal to the apparatus 10, or performing some combination of such actions.

In any case, the operational algorithm embodiment in method 140 may be regarded as an extension or variation of the method 100 and it begins with the apparatus 10 capturing or otherwise obtaining an initial background range map for its field of view (Block 142). The initial background range map comprises, for example, the set of 3D range data that is calculable by the apparatus 10 for its field of view, from the multi-view image data captured by it.

The method 140 continues with the apparatus 10 evaluating its initial background range map for the presence of low-texture regions 56 (Block 144). If one or more low-texture regions 56 are identified (YES from Block 146), the method 140 continues with the apparatus 10 controlling a texture tool 48, or guiding a user to control a texture tool 48, to project synthetic texture 58 onto one or more of the identified low-texture regions 56 (Block 148). (It may be that the texture tool 48 provides for a flood fill of the field of view, so that all such low-texture regions 56 are illuminated.)

The method 140 continues with the apparatus 10 acquiring new image data while the synthetic texture 58 is present, generally for the whole field of view, but at least for one or more of the low-texture regions 56, determining or at least attempting to determine 3D range data for one or more of the low-texture regions 56, and updating the initial background range map for any low-texture regions 56 for which the projected synthetic texture 58 provided sufficiently dense 3D range data (Step 150). Blocks 148 and 150 may be repeated (YES from Block 152), for example, if sufficiently dense 3D range data was not acquired for all of the low-texture regions 56 identified in Block 144. However, any such repeating may be limited, e.g., to a defined number of attempts overall and/or to a defined number of attempts per identified low-texture region 56. As noted earlier, the apparatus' control of the texture tool 48, or its guidance to a user controlling a texture tool 48, may change over the repeated processing blocks—e.g., the texture tool 48 may be pointed at different low-texture regions 56 in each iteration, or the user may be guided to so point the texture tool 48, or the user may be advised to use a different texture pattern or intensity between iterations, or to change the aiming perspective of the texture tool 48, and so on.

Once the apparatus 10 learns the background in its field of view—that is, once sufficiently dense 3D range data has been acquired for the background over the full field of view—the method 140 continues with the apparatus 10 defining or otherwise obtaining a monitoring boundary with respect to the learned background (Block 154). Still further, the method 140 continues with the apparatus 10 providing an opportunity for the user to view the learned boundary (or to view data representing the boundary) and to modify the learned boundary, if the user desires to change any aspect of the learned boundary (Block 156). Once any such modifications are made, the method 140 continues with the apparatus 10 verifying the validity of the monitoring boundary (Block 158).

Figure 7:
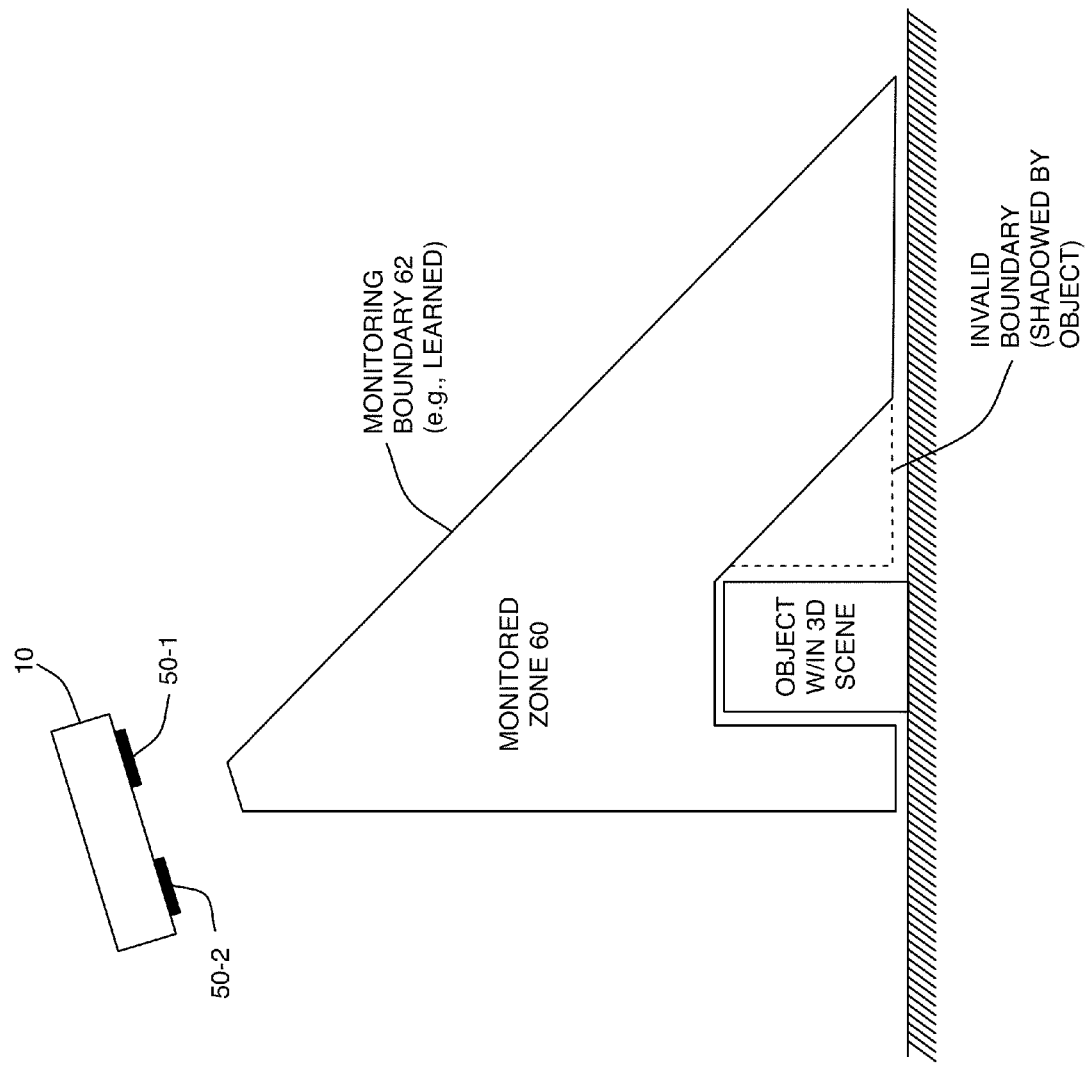
FIG. 7 is a diagram of one embodiment of the apparatus of FIG. 1, illustrating a "shadowed" region within its field of view.

For example, as earlier noted, the apparatus 10 may verify the projective nature of the field of view. See, e.g., FIG. 7, which shows an object within the field of view of the apparatus 10. More specifically, an object resides within monitoring zone 60 bounded by a learned monitoring boundary 62. One sees that the object undesirably "shadows" part of the field of view of the apparatus 10, and thereby creates a shadowed area having invalid boundaries. The verification step can determine such invalid boundaries by comparing the measured 3D range data to the position of the configured boundaries. A configured boundary is valid if it is closer to the apparatus 10, in projective coordinates (e.g. spherical coordinates centered at the multi-view imaging system 12 of the apparatus 10), than the measured 3D range points corresponding to the background surfaces at all locations. In other words, the configured boundary should not be behind the learned background surfaces, as seen from the sensors viewpoint.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of 3D imaging implemented in an apparatus that includes a stereoscopic or other type of multi-view imaging system, said method comprising:

capturing multi-view image data for a field of view of the multi-view imaging system;

evaluating the multi-view image data to identify any regions in the field of view lacking sufficient texture for determining corresponding 3D range data, which regions are regarded as low-texture regions;

in the case that one or more low-texture regions are identified, generating output data or signals to control a texture tool or to guide a user controlling the texture tool, to project synthetic texture into the field of view for the one or more low-texture regions;

capturing multi-view image data at least for the one or more low-texture regions while illuminated with the synthetic texture; and determining whether sufficient texture has been provided for 3D ranging of the low-texture regions and, if so, updating the corresponding 3D range data for the low-texture regions;

wherein the user rather than the apparatus controls the texture tool, and wherein, in the case that one or more low-texture regions are identified, said generating output data or signals to guide the user controlling the texture tool comprises generating output data or signals causing a representation of a scene corresponding to the field of view to be displayed, and further causing the one or more identified low-texture regions to be indicated within said representation; and further wherein generating the output data or signals to guide the user controlling the texture tool further comprises indicating to the user when sufficient texture has been obtained, for individual ones of said identified low-texture regions.

2. The method of claim 1, further comprising configuring monitoring boundaries in the field of view, using the 3D range data, including using the updated 3D range data corresponding to the low-texture regions.

3. The method of claim 2, further comprising verifying the configured monitoring boundaries to ensure that they are within allowable tolerances with respect to the 3D range data, including the updated 3D range data corresponding to the low-texture regions.

4. The method of claim 1, further comprising, if sufficient texture has not been provided for any low-texture region, generating further output data or signals to indicate that case to the user, or generating further output or data signals to again guide the user in controlling the texture tool, to project synthetic texture into the low-texture region or regions where sufficient texture has not been provided.

5. The method of claim 1, wherein generating the output data or signals to guide the user controlling the texture tool further comprises indicating to the user via indicators in said representation where within the field of view of the apparatus that synthetic texture is currently detected.

6. An apparatus that includes a stereoscopic or other type of multi-view imaging system and is configured to perform 3D imaging, said apparatus comprising one or more processing circuits configured to:
capture multi-view image data for a field of view of the multi-view imaging system;
evaluate the multi-view image data to identify any regions in the field of view lacking sufficient texture for determining corresponding 3D range data, which regions are regarded as low-texture regions;
in the case that one or more low-texture regions are identified, generate output data or signals to control a texture tool or to guide a user controlling the texture tool, for projecting synthetic texture into the field of view for the one or more low-texture regions;
capture multi-view image data at least for the one or more low-texture regions while illuminated with the synthetic texture; and
determine whether sufficient texture has been provided for 3D ranging of the low-texture regions and, if so, update the corresponding 3D range data for the low-texture regions;
wherein the apparatus includes at least one of:
a computer interface for transferring guidance information to an external computer, for guiding a user in projecting the synthetic texture where needed; and
a user interface for providing the guidance information.

7. The apparatus of claim 6, wherein said one or more processing circuits are configured to configure monitoring boundaries in the field of view, using the 3D range data, including using the updated 3D range data corresponding to the low-texture regions.

8. The apparatus of claim 7, wherein said one or more processing circuits are configured to verify the configured monitoring boundaries to ensure that they are within allowable tolerances with respect to the 3D range data, including the updated 3D range data corresponding to the low-texture regions.

9. The apparatus of claim 6, wherein, if sufficient texture has not been provided for any low-texture region, the apparatus is configured to generate further output data or signals to indicate that case to the user or to generate further output or data signals to again guide the user controlling the texture tool, for projecting synthetic texture into the low-texture region or regions where sufficient texture has not been provided.

10. The apparatus of claim 6, wherein the one or more processing circuits comprise at least one computer-based circuit that is configured according to its execution of stored computer program instructions.

11. The apparatus of claim 6, wherein the one or more processing circuits comprise a capture controller configured to control capturing of image data by the apparatus, a 3D image evaluator to evaluate the multi-view image data captured by the apparatus and to thereby identify the presence of any low-texture regions within the field of view, and a guidance data generator to generate the output data or signals, for guiding the user controlling the texture tool.

12. The apparatus of claim 6, wherein the apparatus comprises a machine guarding or 3D volume monitoring apparatus that includes a stereoscopic camera system for multi-view imaging of a volume defined by the field of view of the multi-view imaging system.

13. The apparatus of claim 6, wherein the apparatus is configured to determine whether the projection of synthetic texture did not provide sufficient texture for determining the corresponding 3D range data for any of the identified low-texture regions, and, if so, to generate further output data or signals to indicate that case to the user.

14. The apparatus of claim 6, wherein the apparatus is configured to determine whether the projection of synthetic texture did not provide sufficient texture for determining the corresponding 3D range data for any of the identified low-texture regions, and, if so, to generate further output data or signals to again guide the user in controlling the texture tool, to project synthetic texture into the low-texture region or regions where sufficient texture was not provided.

15. The apparatus of claim 6, wherein, in the case that one or more low-texture regions are identified, the apparatus is configured to generate the output data or signals to guide the user controlling the texture tool based on generating output data or signals causing a representation of the field of view to be displayed, and further causing the one or more identified low-texture regions to be indicated within said representation.

16. The apparatus of claim 15, wherein the apparatus is configured to indicate to the user via indicators in said representation where within the field of view of the apparatus that synthetic texture is currently detected.

17. An apparatus that includes a stereoscopic or other type of multi-view imaging system and is configured to perform 3D imaging, said apparatus comprising one or more processing circuits configured to:
capture multi-view image data for a field of view of the multi-view imaging system;
evaluate the multi-view image data to identify any regions in the field of view lacking sufficient texture for determining corresponding 3D range data, which regions are regarded as low-texture regions;
in the case that one or more low-texture regions are identified, generate output data or signals to control a texture tool or to guide a user controlling the texture tool, for projecting synthetic texture into the field of view for the one or more low-texture regions;
capture multi-view image data at least for the one or more low-texture regions while illuminated with the synthetic texture; and
determine whether sufficient texture has been provided for 3D ranging of the low-texture regions and, if so, update the corresponding 3D range data for the low-texture regions;
wherein the user rather than the apparatus controls the texture tool, and wherein, in the case that one or more low-texture regions are identified, the apparatus is configured to generate the output data or signals to guide the user controlling the texture tool based on generating output data or signals causing a representation of the field of view to be displayed, and further causing the one or more identified low-texture regions to be indicated within said representation; and
further wherein the apparatus is configured to indicate to the user when sufficient texture has been obtained, for individual ones of said identified low-texture regions.

* * * * *